(12) United States Patent
Braley

(10) Patent No.: US 6,435,108 B2
(45) Date of Patent: Aug. 20, 2002

(54) DISPOSABLE AND REUSABLE SPACER RACK, AND METHOD OF USING SAME

(76) Inventor: David L. Braley, 210 Pin Oak, Dittmer, MO (US) 63023

( * ) Notice: Subject to any disclaimer, the term of this patent is extended or adjusted under 35 U.S.C. 154(b) by 0 days.

(21) Appl. No.: 09/524,860

(22) Filed: Mar. 14, 2000

Related U.S. Application Data

(63) Continuation-in-part of application No. 09/324,697, filed on Jun. 2, 1999, now abandoned.
(60) Provisional application No. 60/088,406, filed on Jun. 8, 1998.

(51) Int. Cl.[7] .............................................. B65D 19/00
(52) U.S. Cl. .................... 108/51.11; 108/51.3; 108/901
(58) Field of Search ............................ 108/51.11, 51.3, 108/57.17, 57.18, 57.25, 57.28, 57.29, 901, 52.1, 53.1; 248/346.02; 206/555, 386

(56) References Cited

U.S. PATENT DOCUMENTS

| | | | |
|---|---|---|---|
| 3,511,191 A | * 5/1970 | Barry, Jr. et al. | 108/57.28 |
| 4,269,556 A | 5/1981 | Martini | |
| 4,378,743 A | 4/1983 | McFarland | |
| 4,714,026 A | * 12/1987 | Yamaguchi et al. | 108/57.29 |
| 4,863,024 A | * 9/1989 | Booth | 206/386 |
| 4,871,063 A | 10/1989 | Kumbier | |
| 5,042,397 A | 8/1991 | Fiedler | |
| 5,299,691 A | * 4/1994 | Winski | 108/55.3 X |
| 5,425,521 A | * 6/1995 | Locke | 108/901 X |
| 5,463,965 A | 11/1995 | Cordrey | |
| 5,493,962 A | 2/1996 | McCarthy | |
| 5,537,936 A | 7/1996 | Cordrey | |
| 5,537,937 A | 7/1996 | Juvik-Woods | |
| 5,601,035 A | 2/1997 | Herring et al. | |
| 5,609,557 A | 3/1997 | Te | |
| 5,704,300 A | * 1/1998 | Rushton et al. | 108/901 X |
| 5,967,056 A | * 10/1999 | Plante | 108/57.17 X |

FOREIGN PATENT DOCUMENTS

JP 6171649 * 6/1994 ................ 108/51.3

* cited by examiner

Primary Examiner—Janet M. Wilkens
(74) Attorney, Agent, or Firm—Carrier, Blackman & Associates, P.C.; Joseph P. Carrier; William D. Blackman

(57) ABSTRACT

A disposable and reusable spacer rack apparatus, for cooperating with a pallet to suppport a stack of thin sheets of printable stock thereon. A spacer rack apparatus includes a body member, having an upper surface and a substantially flat lower surface. The body member has a series of parallel spaced apart grooves formed in an upper portion thereof, defining a plurality of parallel spaced apart divider slats between the grooves. The body member is of a first height at the divider slats, and is of a second, reduced height in the area of the grooves. The grooves are provided for receiving support rods during a printing stock changeover process. Preferably, the spacer rack apparatus is integrally formed as a single unit, out of relatively inexpensive materials, such as cardboard, fiberboard, recycled plastic, or open-celled plastic foam. A method of using the spacer rack apparatus is also described.

14 Claims, 4 Drawing Sheets

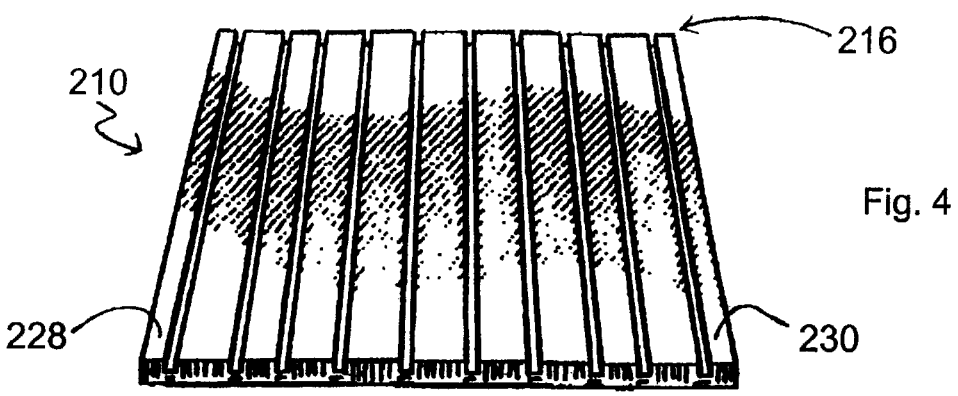
Fig. 4
Fig. 5
Fig. 6
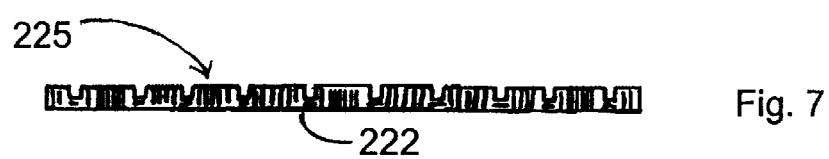
Fig. 7
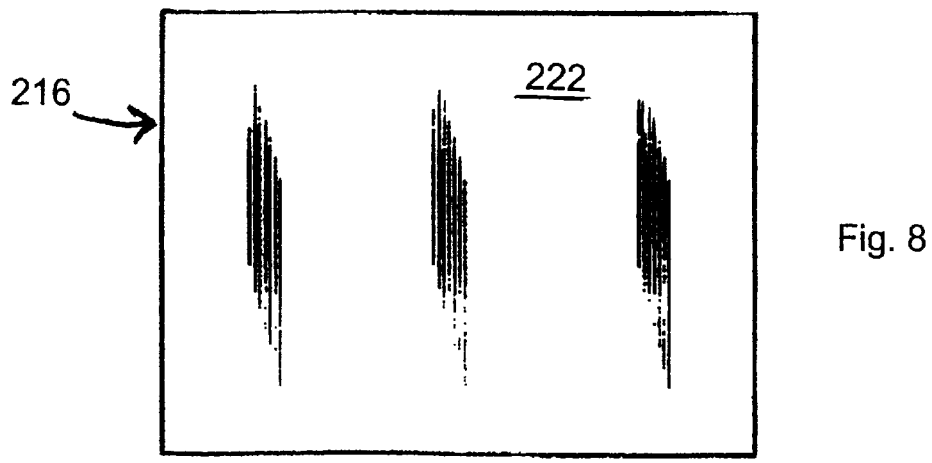
Fig. 8

DISPOSABLE AND REUSABLE SPACER RACK, AND METHOD OF USING SAME

CROSS-REFERENCE TO RELATED APPLICATIONS

The present application is a continuation-in-part of U.S. patent application Ser. No. 09/324,697, filed Jun. 2, 1999, now abandoned, which was in turn based on, and claimed priority of, provisional patent application Ser. No. 60/088,406, filed Jun. 8, 1998. The disclosures of each of the above-identified applications is hereby incorporated by reference.

BACKGROUND OF THE INVENTION

1. Field of the Invention

The present invention relates to a disposable and reusable spacer rack, for placing between a pallet and a stack of thin sheets such as printing paper, and to a method of using the disposable and reusable spacer rack hereof. More particularly, the present invention relates to a substantially rectangular disposable and reusable spacer rack, having a plurality of parallel grooves formed in an upper surface thereof. The spacer rack according to the present invention is provided for use in conjunction with a pallet, in supportively holding a stack of printing paper or other printable sheet stock thereon, for use in a continuously fed, high-volume printing press.

2. Description of the Background Art

Many different types of support pallets and skids, for supporting a load thereon, and which are adapted for movement by a forklift, hand truck, or similar device, are known today. Examples of some types of pallet configurations, and other known types of support apparatus, may be found in U.S. Pat. Nos. 3,853,234, 4,269,556, 4,378,743, 4,871,063, 5,042,397, 5,299,691, 5,463,965, 5,493,962, 5,537,935, 5,601,035, and 5,609,557.

In a continuously fed, high-volume printing operation, using a continuous-feed type of printing press such as, e.g., the Heidelburg Speedmaster model, the conventional approach to loading blank paper into a printing press begins with a step of obtaining a quantity of paper, or other thin sheets of stock material to be printed, which has previously been neatly stacked on top of a conventional wooden pallet. The paper or other printable stock is shipped in this form, from a distributor or manufacturer thereof, to a point of use. Then, after shipment to a print shop where the printing press is located, the paper is manually removed from the shipping pallet, and is manually re-stacked on a specially designed grooved skid, which is provided for supporting a stack of paper as it is fed into the printing press.

The grooved skid used in this process is sold as an accessory to the printing press, and is highly machined to close tolerances. The grooved skid includes a metal base that has machined wheels attached to a bottom surface thereof, for riding in floor rails, and locking clamps for fixing the position of the skid. Since the specialized grooved skid is so complicated and highly machined, it is relatively expensive.

This type of continuous feed printing press also includes a mechanized platform, that is slowly and continuously being raised up during automated operation of the press, to allow individual sheets of paper to be removed from the top of the stack, and fed into the press. When the skid is fully loaded, it is slid on the floor rails and moved on to the platform, which is also provided with built in rails to receive the skid. Then, after other appropriate preparatory steps are taken, the press begins taking paper from the stack, and the platform is moved up automatically as paper is removed therefrom.

When the stack of paper on the moving platform gets relatively short, its weight is less than the weight of a tall stack would be. When the platform reaches a predetermined height on the press, a plurality of support rods or spears are then inserted into, and fed in through, the grooves of the grooved skid, and are then engaged in suitable receptacles, formed in support members which are located at a fixed height on the press, behind the platform. Since the weight of the stack is light at this stage of the process, the spears or support rods alone are able to support the weight thereof. The platform and grooved skid are then both lowered down, away from the support rods and the short stack of paper, and brought to the bottom of travel of the platform, close to the shop floor. The empty grooved skid is then removed from the platform.

A second specialized grooved skid, with a full stack of fresh paper thereon, is then brought to the press and carefully placed on the platform via the rail mechanism, below the short paper stack and support rods. Then, the platform is raised up until the top of the new stack fits snugly against the support rods and touches the bottom of the short stack. The support rods are now located between the old, short stack and the new stack. Finally, the support rods are removed.

The entire process is later repeated, when the platform again gets close to the top of its range of motion. In this way, a continuous supply of paper for the printing press is assured.

While the above-described conventional process for restocking a printing press with fresh paper "on the fly" is useful, and provides paper to the press in an uninterrupted fashion, it nevertheless has some drawbacks and limitations. In particular, it is inconvenient that a fresh pallet of paper comes from the supplier neatly stacked, but has to be manually unloaded from the pallet, and then manually re-stacked. This is a labor-intensive, and therefore costly step. Further, the specialized grooved skids and the floor rail mechanism therefor are relatively expensive, and represent a significant investment for the printer.

Another known approach to feeding paper into this type of printing press is to place a commercially available press-ready skid, stacked with paper, into the press on the platform, to run the press while the paper supply lasts, and later to shut down the press when the paper supply runs out. The empty skid is removed, and a new press-ready skid full of paper is then installed, while the press is shut down. This approach is quite inefficient and disadvantageous, because of the significant down time associated therewith. It is highly preferable to have the printing press running continuously for extended periods of time, and even run around the clock by shift workers.

A specially manufactured plastic pallet is commercially available which is made for use with the above-described type of printing press, the pallet having a flattened upper surface with grooves formed therein to receive the support rods or spears in the above-described process. Plastic pallets of this type are available from Jeco Plastic Products, Inc. of Plainfield, Ind.

While these commercially available modified pallets are useful, they are still relatively expensive, and if a print shop wishes to receive paper pre-stacked on these pallets, it is necessary to purchase and ship the special pallets to a paper distributor, and to make special arrangements to have the paper installed thereon.

Still further, it has been proposed to modify or retrofit a conventional pallet or skid for use with above-described type of printing press by nailing wooden strips to the top boards of the pallet or skid in a spaced arrangement to define grooves for receiving the support rods or spears in the above-described process. Such modified pallets or skids are disadvantageous for several reasons, including the labor-intensive nature of the modification procedure, the lack of uniformity in the grooves thus formed, and contamination of the paper stock caused by transfer of water, dirt, and other foreign matter from the modified pallet or skid which directly supports the stock.

What is needed is a system and apparatus whereby a conventional shipping pallet could be placed directly on top of the lowered platform, with the paper neatly pre-stacked thereon, and used in a printing press without any labor-intensive unloading and restacking, but which could retain the advantageous features of the existing approach, including a slotted or grooved spacer apparatus, for inserting the support rods into, below a short stack of paper, to allow for paper reloading while the press is in operation.

Preferably, a spacer rack could be designed which would work with existing machines, including the support rods or spears thereof, is free of imperfections and contaminations, is relatively inexpensively so as to be disposable, but is sufficiently durable to be re-usable.

SUMMARY OF THE INVENTION

The present invention provides a disposable and reusable spacer rack apparatus for cooperating with a pallet to support a stack of printing paper thereon. A spacer rack apparatus according to a first embodiment of the present invention, generally, includes a substantially rectangular body member, the body member including a substantially flattened base portion having an upper surface and a lower surface, and a plurality of parallel spaced apart divider slats attached to the upper surface of the base portion. The parallel spaced apart divider slats define a plurality of open grooves therebetween, for receiving support rods therein during a paper change process.

In a preferred embodiment of the present invention, the spacer rack apparatus is integrally formed as a single unit, out of relatively inexpensive materials, such as cardboard, recycled plastic, or open-celled plastic foam.

A spacer rack apparatus according to a second preferred embodiment of the present invention is formed from a sandwich-type intermediate body in a machining operation. The intermediate body includes an upper facing which is a first thin sheet of material, a lower facing which is a second thin sheet of material substantially identical to the upper facing and oriented parallel thereto, and a central core, which is disposed between the upper and lower facings and is attached thereto. The central core is formed from a matrix material including wall sections oriented substantially transverse to the upper and lower facings. The central core may be formed in a hexagonal honeycomb pattern, with cells thereof having a diameter of between ½ inch and ¾ inch in diameter.

Accordingly, it is an object of the present invention to minimize the amount of labor required for re-stocking a contiuous feed type of printing press with paper.

It is a further object of the present invention to provide a method and apparatus for restocking a printing press with paper, which would allow re-stocking during operation thereof, but which would obviate the necessity for manually unloading and re-stacking the paper.

It is yet a further object of the present invention to provide a less expensive alternative to the customized grooved skid which is currently used to load paper into the above-described type of printing press.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 4 is a perspective view of a disposable and reusable spacer rack according to a second embodiment of the present invention, with grooves thereof shown parallel to a line-of-sight viewing direction;

FIG. 5 is a top plan view of the spacer rack of FIG. 4;

FIG. 6 is a side plan view of the spacer rack of FIG. 4;

FIG. 7 is an end plan view of the spacer rack of FIG. 4;

FIG. 8 is a bottom plan view of the spacer rack of FIG. 4;

DETAILED DESCRIPTION OF THE PREFERRED EMBODIMENT

First Embodiment

Figure 1:
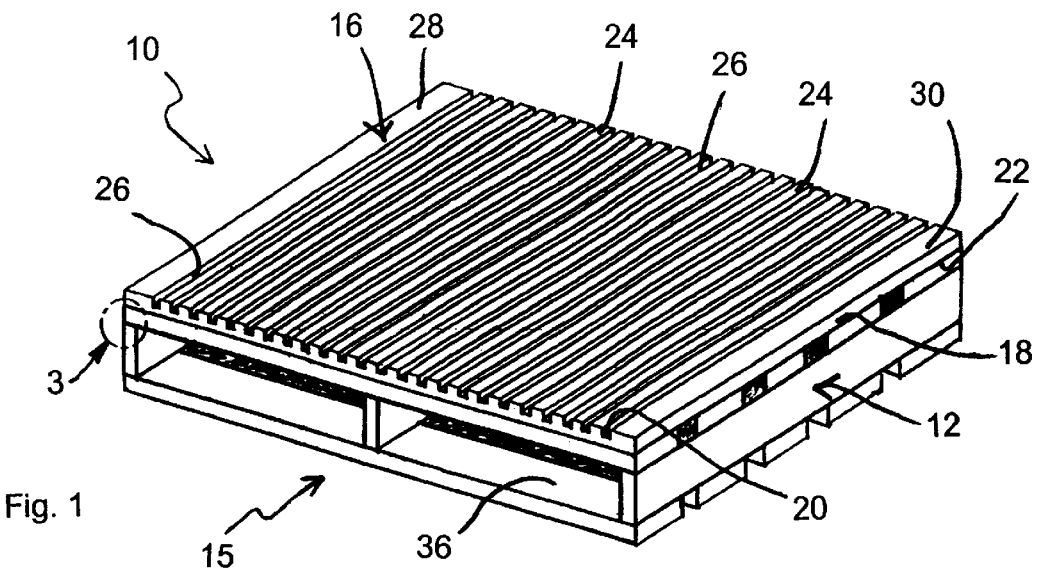
FIG. 1 is a perspective view of a disposable and reusable spacer rack according to a first embodiment of the present invention, sitting atop a pallet.

Referring now to FIGS. 1–3B of the drawings, a disposable and reusable low cost spacer rack apparatus, according to a first embodiment of the present invention, is shown generally at 10. The spacer rack apparatus 10 hereof is shown placed on top of a pallet 12, and is provided for cooperating with a pallet 12 to support a stack 14 of printing paper thereon. As used herein, the term "pallet" broadly indicates pallets (which typically have top and boards with runners therebetween), skids (which typically have only top boards supported on runners), and other such supporting devices.

Throughout the present specification, numerous references are made to paper, stacks of paper, and the like. It will be understood by those skilled in the relevant art that the present invention may be used with card stock, with transparent or opaque plastic sheets, or with other thin sheets of printable stock material to be printed on in a printing press. As used throughout the present specification, the term 'paper' is not intended to be interpreted as a limitation on how the invention may be used, but rather is provided as an illustration, since paper is the most commonly used type of printing stock.

The pallet 12 is of generally conventional construction, although it is preferred to be kept to a higher standard of quality than some pallets which are available. The length and width dimensions of the spacer rack apparatus are approximately the same as those of the upper surface of the pallet 12, so as to fit easily thereon. The pallet 12 may be made of wood or plastic. The pallet 12 is constructed so as to define open channels 36 therein for receiving the tines (not shown) of a hand truck, forklift, or similar lifting mechanism therein.

The spacer rack apparatus 10 normally is insufficient in strength and durability to function as a sole support for a stack of blank paper or other printing stock, especially for purposes of handling and transportation thereof, but the spacer rack apparatus hereof is not required to be self-supporting, or to have great strength and durability, because it is used together with the conventional pallet 12, which provides strength and durability to the combination 15 of the pallet and spacer rack. Moreover, the spacer rack 10 can be made very inexpensively, as discussed further hereinbelow, because it is not required to be self-supporting. The ability to make the spacer rack 10 inexpensively is very desirable because the rack may, as a practical matter, be disposed of after only a single use. Of course, the spacer racks 10 may be reused, if desired, at the discretion of the user. If the spacer racks 10 are intended to be reused, they may be made a little more durable than if they are intended to be discarded.

A spacer rack apparatus 10 according to the present invention, generally, includes a substantially rectangular body member 16. The body member 16 includes a substantially flattened base portion 18 having an upper surface 20 and a lower surface 22. The body member 16 also includes a plurality of parallel spaced apart divider slats 24, which are attached to the upper surface 20 of the base portion 18. In one embodiment, the divider slats 24 are about ½" to 1 inch wide, and substantially the same height as they are wide, as shown.

The parallel spaced apart divider slats 24 define a plurality of parallel open grooves 26 therebetween, for receiving support rods (not shown) during a paper change process. The grooves 26 are about the same width as the divider slats 24. The body member 16 may include extra wide slats 28, 30 at opposite side edges thereof, as shown for strength and reinforcement.

The base portion 18 and the slats 24 may be constructed separately, and connected together with appropriate bonding or fastening means such as nails, staples and/or glues or other adhesives. Alternatively, the base portion 18 and slats 24 may be integrally constructed as a single unitary member. In either case, the materials used are preferably inexpensive, such as wood, plastic, plastic foam, cardboard, fiber board, pressboard, or the like.

In a preferred embodiment of the present invention, the spacer rack apparatus 10 is integrally formed as a single unit, out of relatively inexpensive materials, such as cardboard, fiber board, recycled or recyclable plastic, or plastic foam.

Figure 3A:
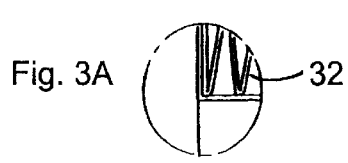
FIG. 3A is a detail view of the spacer rack and pallet of FIG. 1, taken inside the circle labeled 3 in FIG. 1, and showing a first possible construction of the spacer rack.
Figure 3B:
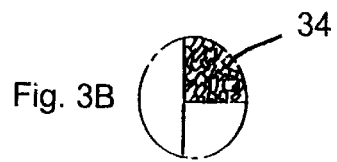
FIG. 3B is a detail view of the spacer rack and pallet of FIG. 1, taken inside the circle labeled 3 in FIG. 1, and showing a second possible construction of the spacer rack.
Figure 9:
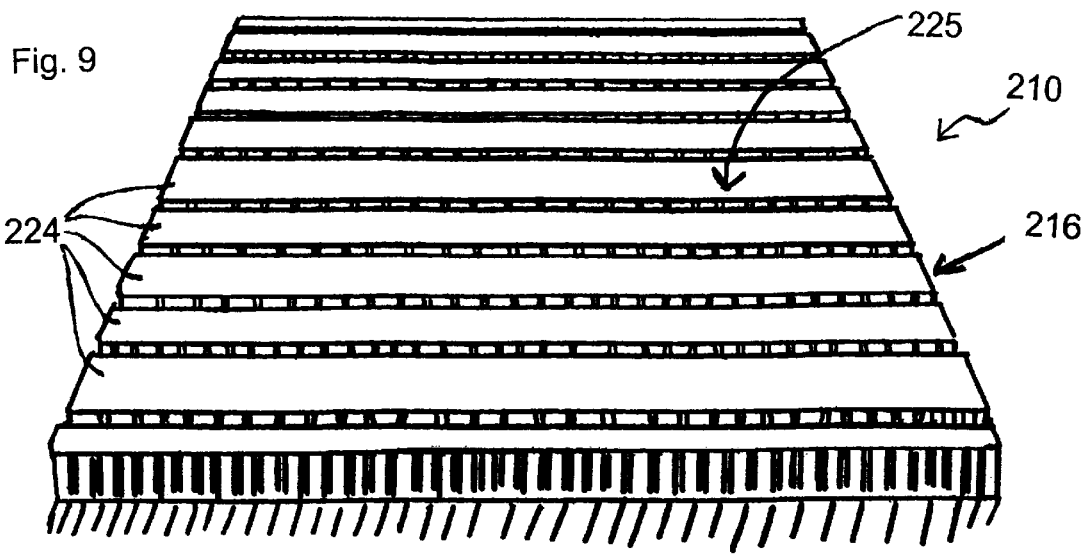
FIG. 9 is a perspective view of the disposable and reusable spacer rack of FIG. 4, with the grooves thereof shown perpendicular to a line-of-sight viewing direction.
Figure 10:
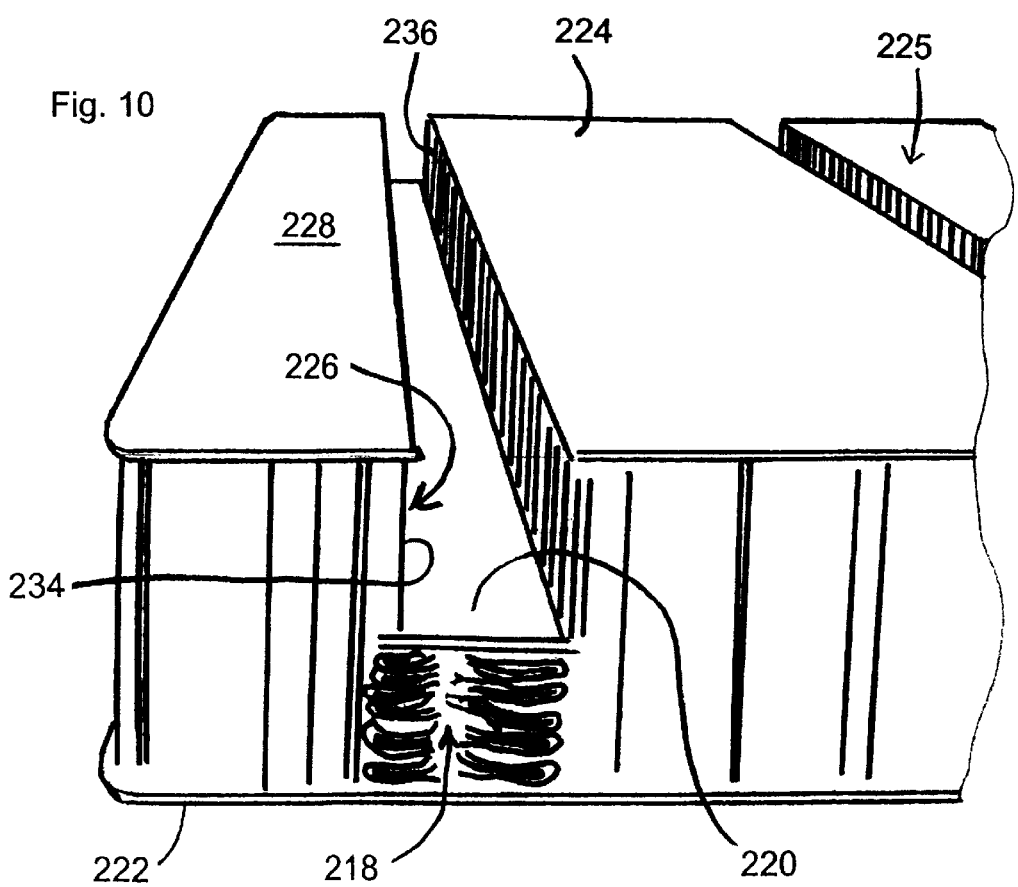
FIG. 10 is a detail perspective view of a corner part of the spacer rack of FIG. 4.

As shown in FIG. 3A, the spacer rack apparatus 10 could be made of cardboard 32. Alternatively, the spacer rack apparatus 10 could be made of chopped paper or fiberboard. As yet another alternative, and as shown in FIG. 3B, the spacer rack apparatus 10 could be molded out of an open-celled plastic foam 34.

Second Embodiment

Referring now to FIGS. 4–10 of the drawings, a disposable and reusable low cost spacer rack apparatus, according to a second embodiment of the present invention, is shown generally at 210. The spacer rack apparatus 210 hereof is preferably made of corrugated cardboard material and, as in the first embodiment, is intended for placement on top of a pallet 12, and is provided for cooperating with the pallet 12 to support a stack 14 of printing paper thereon. As used herein, the term "pallet" broadly indicates pallets (which typically have top and boards with runners therebetween), skids (which typically have only top boards supported on runners), and other such supporting devices.

The spacer rack apparatus 210 normally is insufficient in strength and durability to function as a sole support for a stack of blank paper or other printing stock, especially for purposes of handling and transportation thereof, but the spacer rack apparatus hereof is not required to be self-supporting, or to have great strength and durability, because it is used together with the conventional pallet 12, which provides strength and durability to the combination of the pallet and spacer rack. Moreover, the spacer rack 210 can be made very inexpensively, as discussed firther hereinbelow, because it is not required to be self-supporting. The ability to make the spacer rack 210 inexpensively is, again, very desirable because the rack may, as a practical matter, be disposed of after only a single use. Of course, the spacer racks 210 may be reused, if desired, at the discretion of the user. If the spacer racks 210 are intended to be reused, they may be made a little more durable than if they are intended to be discarded.

The spacer rack apparatus 210 according to the second embodiment of present invention, is formed out of an intermediate member 211 (FIG. 11) which is generally a substantially rectangular body member having a sandwich-like configuration. The intermediate member 211 includes a substantially flat sheet-like upper facing 215, a substantially flat sheet-like lower facing 217 parallel to the upper facing, and a central core 219 disposed between the upper and lower facings. The upper and lower facings 215, 217 are attached to the central core 219 and are preferably glued thereto. The upper and lower facings 215, 217, and the central core 219 are preferably all formed of cardboard material.

Figure 12:
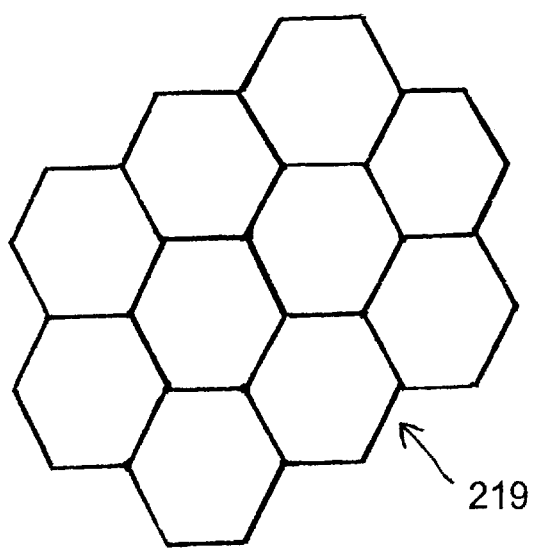
FIG. 12 is a top plan view of a cut away portion of a central core layer of the intermediate member of FIG. 11.

The central core 219 is preferred to be made as a honeycomb-like matrix of regularly spaced hexagonal cells connected together, as shown in FIG. 12. The cells are preferably of a diameter between ½ and 1 inch in diameter. ¾" diameter cells are the most preferred.

Figure 11:
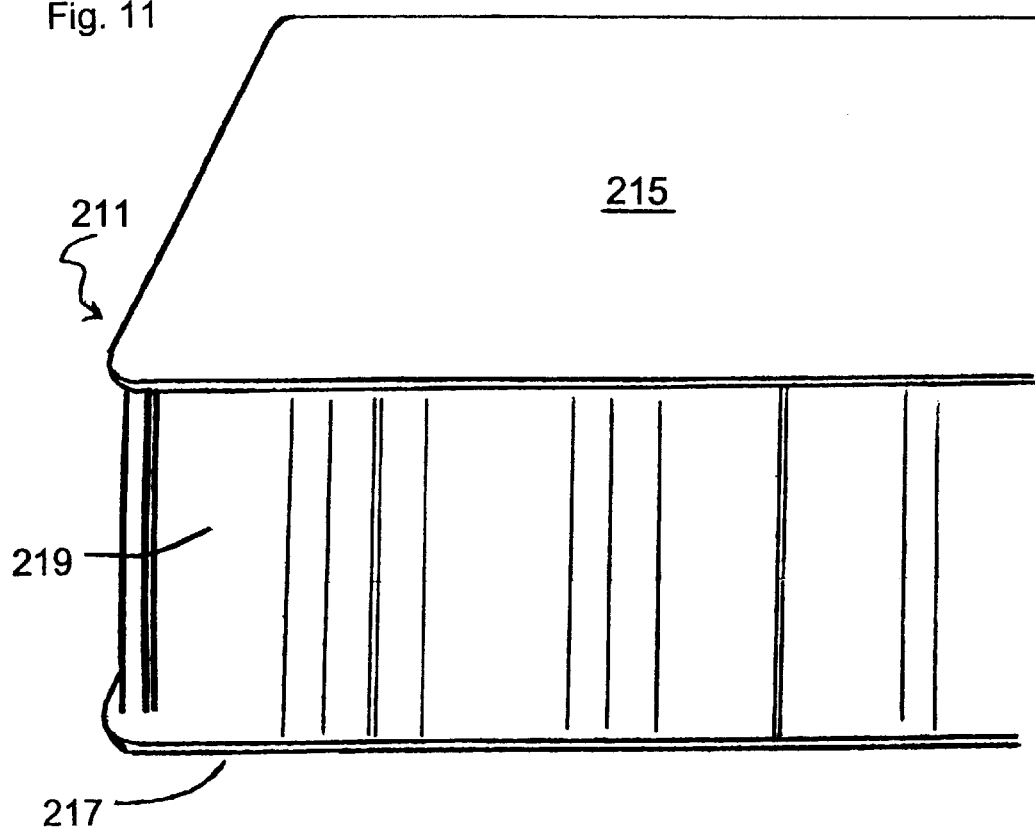
FIG. 11 is a detail perspective view of a corner part of an intermediate member which is used to form the spacer rack of FIG. 4.

In forming the spacer rack 210 out of the intermediate member 211, a machine tool (not shown) is used to punch-cut and crush down selected areas of the upper facing 215 and part of the central core 219, to form grooves 226 in the upper surface thereof, thereby transforming the intermediate member 211 of FIG. 11 into the finished spacer rack of FIGS. 4–10. The machine tool includes parallel spaced apart blades which cut parallel slits through the upper facing 215 in the area of the grooves 226. The machine tool farther includes a flat crushing section between the blades, which pushes downwardly on a cut-away strip portion of the upper facing 215, and which compresses part of the central core 219 to a selected depth in the body member 216. After the machine tool has formed the grooves 226 in the body member 216, the cut-away strip portion of the upper facing 215 which has been moved downwardly in the body member 216 defines a floor 220 at the bottom of the groove.

The crushing down of the grooves 226, in the body member 216, also defines a plurality of parallel spaced apart divider slats 224, in the areas of the body member which remain uncompressed. Taken together, the upper surface of all of the divider slats 224 defines an upper support surface 225 of the spacer apparatus 210 for supporting a plurality of thin sheets of printable stock thereon. In one embodiment, the divider slats 224 are about ½" to 1 inch higher than the floor 220, and are made in varying widths according to a predetermined pattern. The total height of the spacer apparatus 210 is between 1 and 2 inches. After the crushing operation, selected portions of the central core 219 remain compressed in the area of the grooves 226, and selected portions of the upper facing 215 define floor portions 220 at the bottom of the grooves.

The resultant structure, as shown in the drawings, is preferably one in which the floor portions 220 of the sheet body 216, in the area of the grooves 226, is substantially flat and horizontally oriented. The adjacent walls 234, 236, on opposite sides of the grooves 226, are corrugated rather than being completely flat, are substantially vertically oriented, and are disposed along planes which are substantially perpendicular to the floor 220.

The parallel spaced apart divider slats 224 are spaced between the plurality of parallel open grooves 226. The grooves 226 are provided for receiving support rods (not shown) during a paper change process. The grooves 226 are about ½" to 1 inch wide by ½" to 1" deep.

The body member 216 may include extra narrow outer slats 228, 230 at opposite side edges thereof, as shown, to conserve material.

Methods of Use

Figure 2:
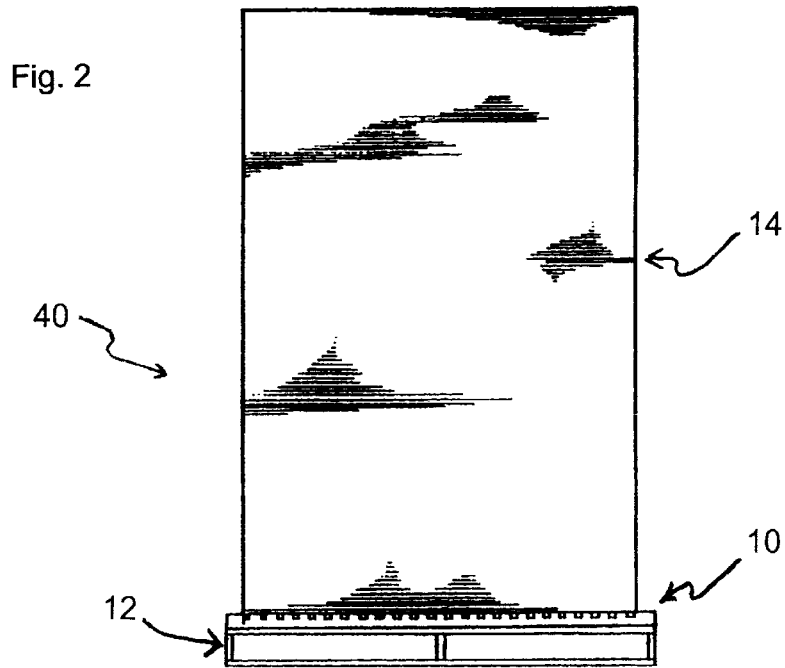
FIG. 2 is a front plan view of the pallet and spacer rack of FIG. 1, shown with a stack of paper thereon.

In a first method of using a spacer rack apparatus according to the present invention, an initial step is obtaining a stack assembly 40 which includes a pallet 12 with a spacer rack 10 as described herein disposed on top of the pallet, and a paper stack 14 disposed on the spacer rack, as shown in FIG. 2. The next step in the method is placing the pallet 12, with the spacer rack 10 and paper stack 14 thereon, on a movable platform of a printing press, and operating the printing press to use individual sheets of paper from the stack while moving the platform vertically upwardly. The next step in the method is inserting a plurality of support rods into, and through, the grooves 26 of the spacer rack and attaching them to a fixed portion of the printing press behind the platform. The next step in the method is lowering the platform downwardly, while supporting the remaining paper stack on the support rods. The final step in the first method hereof is removing the pallet and support rack from the platform. The sequence of steps is repeated, as desired, to provide continuous operation of the printing press. The method according to the present invention may include a further step of disposing of the spacer rack 10. Alternatively, the method according to the present invention may include a further step of sending the spacer rack 10 to a paper manufacturer or supplier, to be reused.

Although the present invention has been described herein with respect to a preferred embodiment thereof, the foregoing description is intended to be illustrative, and not restrictive. Those skilled in the art will realize that many modifications of the preferred embodiment could be made which would be operable. For example, the spacer rack 10 could have a shape other than rectangular, the slats 24 could be made of a cross-sectional shape other than rectangular, the spacer rack could be used in conjunction with a pallet 12 to support loads other than stacked printing stock, etc. All such modifications, which are within the scope of the claims, are intended to be within the scope and spirit of the present invention.

I claim:

1. A disposable and reusable spacer rack apparatus for cooperating with a pallet to support a stack of thin sheets thereon, said spacer rack apparatus comprising:
    a body member, having an upper surface and a substantially flat lower surface, said body member being formed from a material having a plurality of hollow spaces therein; and
    wherein said body member has a series of parallel spaced apart grooves formed in an upper portion thereof, defining a plurality of parallel spaced apart divider slats between said grooves, said divider slats being constructed and arranged to support said stack of thin sheets directly thereon;
    and further wherein said body member is of a first height at said divider slats, and said body member is of a second height in the area of said grooves, said second height being less than said first height.

2. The spacer rack apparatus of claim 1, wherein the body member has a substantially rectangular shape.

3. The spacer rack apparatus of claim 1, wherein the apparatus is integrally formed as a single unit.

4. The spacer rack apparatus of claim 1, wherein the apparatus comprises cardboard.

5. The spacer rack apparatus of claim 1, wherein the apparatus comprises fiberboard.

6. The spacer rack apparatus of claim 1, wherein the apparatus comprises plastic.

7. The spacer rack apparatus of claim 6, wherein the apparatus comprises a plastic foam material.

8. The apparatus of claim 1, wherein the apparatus is dimensioned to fit on top of a pallet.

9. The apparatus of claim 1, wherein said body member comprises adjacent walls on opposite sides of said grooves, wherein each of said walls is substantially vertically oriented, and wherein said adjacent walls are disposed along planes which are substantially parallel to one another.

10. A disposable and reusable spacer rack apparatus dimensioned to fit on top of a pallet to support a stack of in sheets thereon, said spacer rack apparatus comprising:
    a body member formed from a material having a plurality of hollow spaces therein, said body member comprising an upper facing, a lower facing, and a central core disposed between said upper and lower facings;
    wherein said body member has a sense of parallel grooves formed in an upper portion thereof, defining a plurality of parallel spaced apart divider slats between said grooves;
    said divider slats of body member having a first height, and said body member having a reduced height, in the area of said grooves, which is less than said first height.

11. The spacer rack apparatus of claim 10, wherein a part of said upper facing is displaced downwardly in selected areas thereof, to define a floor portion at an area of said body member immediately below each of said grooves.

12. The spacer rack apparatus of claim 10, wherein said central core, and said upper and lower facings are formed of cardboard.

13. The spacer rack apparatus of claim 10, wherein said central core is a matrix of regularly spaced cells connected together.

14. The spacer rack apparatus of claim 13, wherein said regularly spaced cells are hexagonal in cross section and have a diameter in a range of ½"–1".

* * * * *